United States Patent
Yang et al.

(10) Patent No.: US 12,071,585 B2
(45) Date of Patent: Aug. 27, 2024

(54) SELF-REPAIRING PLUGGING GEL POLYMER FOR DRILLING FLUID, PREPARATION METHOD AND APPLICATION THEREOF, AND DRILLING FLUID CONTAINING GEL POLYMER

(71) Applicant: China University of Petroleum (Beijing), Beijing (CN)

(72) Inventors: Lili Yang, Beijing (CN); Chunlin Xie, Beijing (CN); Guancheng Jiang, Beijing (CN); Tian Ao, Beijing (CN); Dechang Kong, Beijing (CN); Kaixiao Cui, Beijing (CN)

(73) Assignee: China University of Petroleum (Beijing), Beijing (CN)

( * ) Notice: Subject to any disclaimer, the term of this patent is extended or adjusted under 35 U.S.C. 154(b) by 305 days.

(21) Appl. No.: 17/517,599

(22) Filed: Nov. 2, 2021

(65) Prior Publication Data
US 2022/0298405 A1    Sep. 22, 2022

(30) Foreign Application Priority Data
Mar. 19, 2021  (CN) .......................... 202110297074.6

(51) Int. Cl.
*C09K 8/508*    (2006.01)
(52) U.S. Cl.
CPC ........ *C09K 8/5083* (2013.01); *C09K 2208/30* (2013.01); *C09K 2208/34* (2013.01)
(58) Field of Classification Search
CPC .............. C09K 8/5083; C09K 2208/30; C09K 2208/34
See application file for complete search history.

(56) References Cited

U.S. PATENT DOCUMENTS

| | | | | |
|---|---|---|---|---|
| 6,036,765 A | * | 3/2000 | Farrow | C09K 8/46 501/148 |
| 6,286,601 B1 | * | 9/2001 | Argillier | C09K 8/38 175/69 |

(Continued)

FOREIGN PATENT DOCUMENTS

| | | |
|---|---|---|
| CN | 104140791 A | 11/2014 |
| CN | 104610485 A | 5/2015 |

(Continued)

OTHER PUBLICATIONS

Jiang, Guancheng, et al., "A saturated saltwater drilling fluid based on salt-responsive polyampholytes," Petroleum Exploration and Development, vol. 46, Issue 2, Sep. 2020.

(Continued)

*Primary Examiner* — Alicia Bland
(74) *Attorney, Agent, or Firm* — Calfee, Halter & Griswold LLP

(57) ABSTRACT

The invention relates to the field of oilfield chemistry, and discloses a self-repairing plugging gel polymer for drilling fluid, a preparation method and application thereof, and the drilling fluid containing the gel polymer, wherein the polymer contains a structural unit A, a structural unit B, a structural unit C and a structural unit D, and the structural unit A is a structural unit with a structure shown in the formula (1); the structural unit B is a structural unit with a structure shown in the formula (2); the structural unit C is a structural unit with a structure shown in the formula (3); the structural unit D is a structural unit having a structure represented by the formula (4). The polymer provided by the invention has excellent mechanical properties and good self-repairing properties, and when the polymer is used as a plugging agent of water-based drilling fluid, the polymer has (Continued)

good plugging properties and high plugging layer repairing efficiency, and simultaneously has good high-temperature resistance.

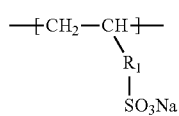

formula (1)

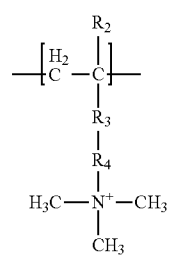

formula (2)

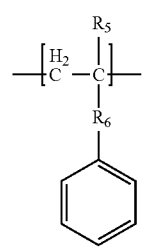

formula (3)

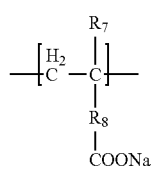

formula (4)

17 Claims, 7 Drawing Sheets

(56) References Cited

U.S. PATENT DOCUMENTS

| | | | | |
|---|---|---|---|---|
| 9,353,305 | B1* | 5/2016 | Jiang | C09K 8/035 |
| 2010/0210486 | A1* | 8/2010 | Horton | C09K 8/512 |
| | | | | 507/224 |
| 2010/0230106 | A1* | 9/2010 | Milne | C09K 8/882 |
| | | | | 507/224 |
| 2010/0307753 | A1* | 12/2010 | Rey | C09K 8/88 |
| | | | | 166/305.1 |
| 2011/0110989 | A1* | 5/2011 | Simonnet | A61K 8/90 |
| | | | | 514/159 |
| 2015/0101808 | A1* | 4/2015 | Saini | C09K 8/805 |
| | | | | 166/308.1 |
| 2015/0166876 | A1* | 6/2015 | Labarre | C08F 220/06 |
| | | | | 507/224 |
| 2015/0368538 | A1* | 12/2015 | Wang | E21B 7/00 |
| | | | | 166/305.1 |

FOREIGN PATENT DOCUMENTS

| | | |
|---|---|---|
| CN | 106318348 A | 1/2017 |
| CN | 106433584 A | 2/2017 |
| CN | 109970916 A | 7/2019 |
| CN | 111171232 A | 5/2020 |
| CN | 111808578 A | 10/2020 |
| CN | 111909670 A | 11/2020 |
| CN | 112409611 A | 2/2021 |
| IN | 111088003 A | 5/2020 |
| WO | 2010132851 A1 | 11/2010 |
| WO | 2015038750 A1 | 3/2015 |

OTHER PUBLICATIONS

He, Yinbo, et al., "Stimulus-responsive mechanism of salt-responsive polymer and its application in saturated saltwater drilling fluid," Petroleum Exploration and Development, vol. 47, Issue 5, Jul. 2020, pp. 1052-1058. English abstract attached.

Jiang, Guancheng, et al., "Synthesis of an amphoteric polymer as a high-temperature-resistant shale stabilizer in water-based drilling fluids," Journal of Applied Polymer Science, vol. 137, Issue 35, Apr. 2019, pp. 401-406.

* cited by examiner

SELF-REPAIRING PLUGGING GEL POLYMER FOR DRILLING FLUID, PREPARATION METHOD AND APPLICATION THEREOF, AND DRILLING FLUID CONTAINING GEL POLYMER

CROSS-REFERENCE TO RELATED APPLICATION

The application claims priority to Chinese Application No. 202110297074.6, filed on Mar. 19, 2021, which is herein specifically and entirely incorporated by reference.

TECHNICAL FIELD

The invention relates to the field of oilfield chemistry, in particular to a self-repairing plugging gel polymer suitable for water-based drilling fluid, a method for preparing the self-repairing plugging gel polymer suitable for the water-based drilling fluid, the polymer prepared by the method, application of the polymer as a plugging agent in the drilling fluid, and the drilling fluid containing the polymer as the plugging agent.

BACKGROUND

Along with the drilling operation towards the development of deep wells, deep sea and shale gas of unconventional oil gas resources, the drilling fluid density window is narrow and the wall of a mud shale well is instable are the causes of frequent well leakage, the understanding of the leakage problem is continuously deepened, the effective plugging of a formation leakage channel is gradually realized, plugging materials are required to be accumulated in the leakage channel, and the internal space of pores and cracks is occupied by blocking materials as much as possible, which severely restricted the success or failure of drilling and influenced the economic benefit.

Although a great deal of research is carried out on the problem, however, the problems of well wall instability and formation leakage still cannot be completely solved. Exploring the leakage causes of the well wall, finding the keys of leakage, preparing efficient plugging materials, accumulating the plugging materials in a leakage channel to form a compact filling layer to reduce the permeability of the leakage layer and bear the leakage pressure are the problems of safe and efficient drilling operation to be urgently solved.

At present, a large amount of research work to plugging materials for drilling fluid were carried out in domestic and abroad. However, regardless of the plugging material in drilling fluid or the plugging material stop in drilling fluid, there are problems such as insufficient toughness of the plugging wall and bridge plug, and then make the plugging failure, especially the occurrence of pressure fluctuation in the well in the work progress such as hoisting or running operation, which can make the insufficient toughness of the plugging slug destroyed or plugging effect reduced, and then make the drilling fluid to break through the slug and flow direction formation depths.

The gel polymer is used as a three-dimensional polymer network taking water as a medium, and it has high viscoelasticity. The number and the types of intermolecular chemical bonds determine the shape and the performance of the polymer network. After the plugging agent enters a formation, retention, accumulation, bridging and filling of various components occur under the conditions of the temperature and the pressure of the formation, and respective synergistic effects are fully exerted, so that the cementation capacity and the plugging pressure-bearing capacity of the leakage formation are integrally improved, and the aim of plugging a leaking formation is fulfilled.

Gel materials have long been used extensively for plugging because of their excellent compactness, unique high temperature deformability, and broad applicability.

Therefore, it is of great practical significance to develop a new gel polymer which can have good plugging performance and self-repairing performance.

Disclosure of the Invention

The invention aims to solve the problems of poor plugging performance and repeated leakage of a plugging agent in the prior art, and provides a plugging gel polymer with high plugging performance and self-repairing performance.

In order to achieve the aim, the first aspect of the invention provides a self-repairing plugging gel polymer suitable for water-based drilling fluid, which contains a structural unit A, a structural unit B, a structural unit C and a structural unit D, the structural unit A is a structural unit with a structure shown in the formula (1); the structural unit B is a structural unit with a structure shown in the formula (2); the structural unit C is a structural unit with a structure shown in the formula (3); the structural unit D is a structural unit with a structure shown in the formula (4);

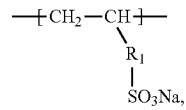

formula (1)

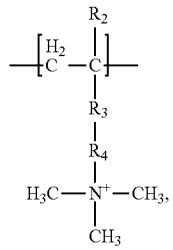

formula (2)

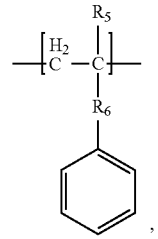

formula (3)

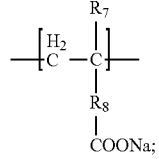

formula (4)

wherein,
in the formula (1), $R_1$ is selected from phenyl ring or $C_{1-3}$ alkylene;
in the formula (2), $R_2$ is selected from H or —$CH_3$, $R_3$ is selected from —CO—NH— or —CO—O—, and $R_4$ is selected from $C_{1-3}$ alkylene;

in the formula (3), $R_5$ is selected from H or —$CH_3$, $R_6$ is selected from $C_{1-3}$ alkylene;

in the formula (4), $R_7$ is selected from H or —$CH_3$, and $R_8$ is selected from phenyl ring or $C_0$ alkylene.

The second aspect of the invention provides a method of making a self-repairing plugging gel polymer suitable for water-based drilling fluids, the method comprising:

carrying out polymerization reaction on each component in a polymerization combination in the presence of an alkaline substance and an initiator in an aqueous solvent and a protective atmosphere, wherein the polymerization combination contains a monomer A', a monomer B', a monomer C' and a monomer D';

the monomer A' is selected from monomers with a structure shown in the formula (I); the monomer B' is selected from monomers with a structure shown in the formula (II); the monomer C' is selected from monomers with a structure shown in the formula (II); the monomer D' is selected from monomers with a structure shown in the formula (IV);

the monomer A', the monomer B', the monomer C' and the monomer D' respectively enable the prepared polymer to contain a structural unit A, a structural unit B, a structural unit C and a structural unit D, and the structural unit A is a structural unit with a structure shown in the formula (1); the structural unit B is a structural unit with a structure shown in the formula (2); the structural unit C is a structural unit with a structure shown in the formula (3); the structural unit D is a structural unit with a structure shown in the formula (4);

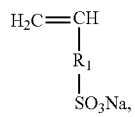

formula (I)

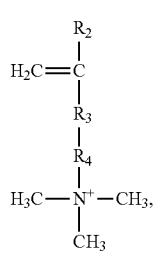

formula (II)

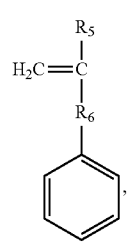

formula (III)

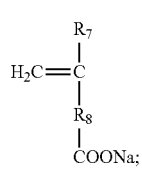

formula (IV)

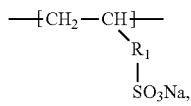

formula (1)

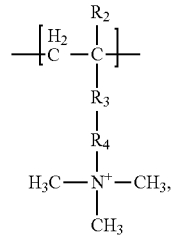

formula (2)

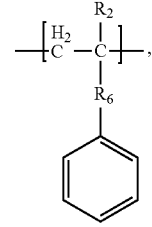

formula (3)

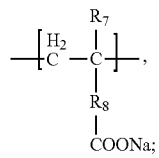

formula (4)

Wherein, $R_1$, $R_2$, $R_3$, $R_4$, $R_5$, $R_6$, $R_7$, $R_8$ are the same as the definitions of the first aspect.

The third aspect of the invention provides a self-repairing plugging gel polymer suitable for water-based drilling fluids made by the method of the second aspect described above.

The fourth aspect of the invention provides the use of the self-repairing plugging gel polymer suitable for water-based drilling fluid described in the first and the third aspects as a plugging agent in a drilling fluid.

The fifth aspect of the invention provides a drilling fluid containing the self-repairing plugging gel polymer suitable for water-based drilling fluids of the first and the third aspects as a plugging agent.

The gel polymer provided by the invention has excellent mechanical properties and good self-repairing properties, and has good plugging properties and higher plugging layer repairing efficiency when being used as a plugging agent of water-based drilling fluid, and also has better high temperature resistance.

The method for preparing the gel polymer has the advantages of simple preparation process and low cost. It also has wide industrial application prospect.

Additional features and advantages of the invention will be described in the detailed description which follows.

DRAWINGS

Figure 3:
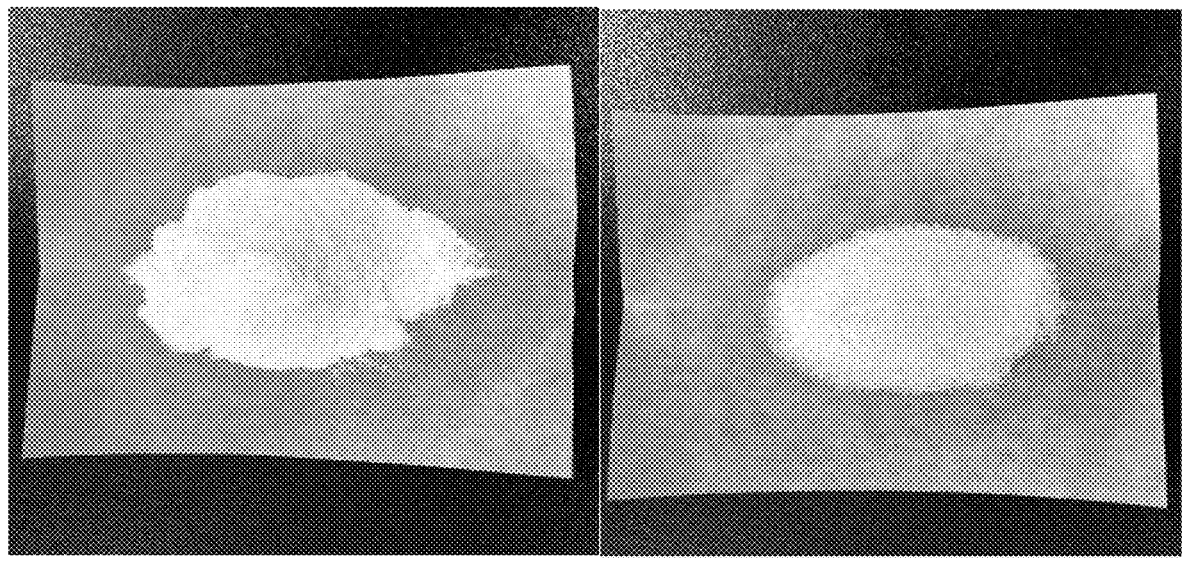

The left graph of FIG. 3 is powder of gel polymer S1 with 60-100 meshes, and the right graph of FIG. 3 is particles of gel polymer S1 with 40-60 meshes.

Figure 4:
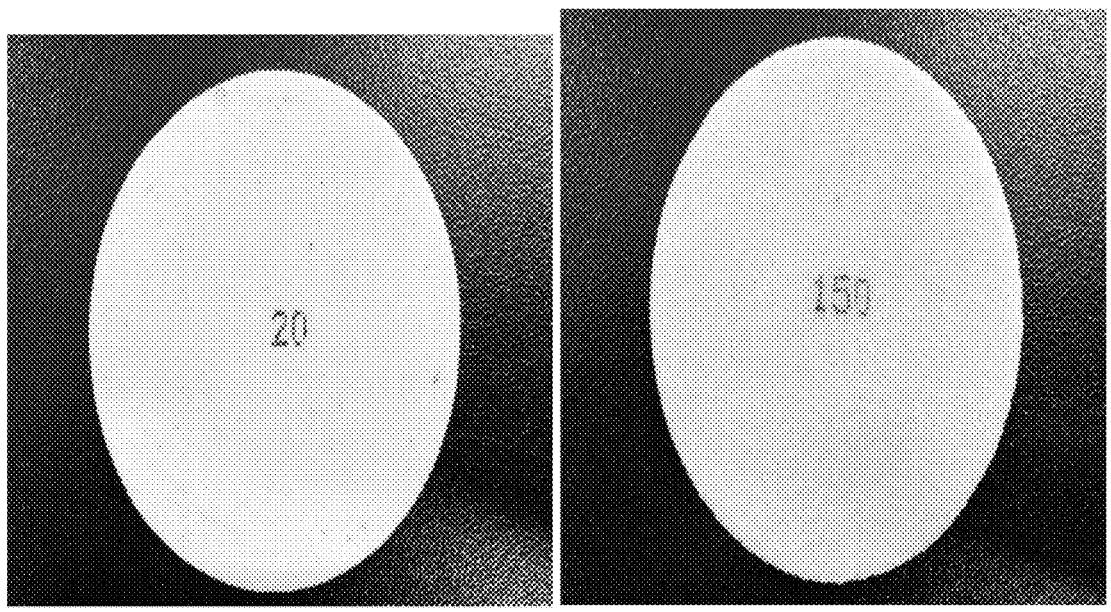

The left graph in FIG. 4 is a 20 μm quartz sand disc with the permeability of 50D, and the right graph in FIG. 4 is a 150 μm quartz sand disc with the permeability of 180D.

Figure 5:
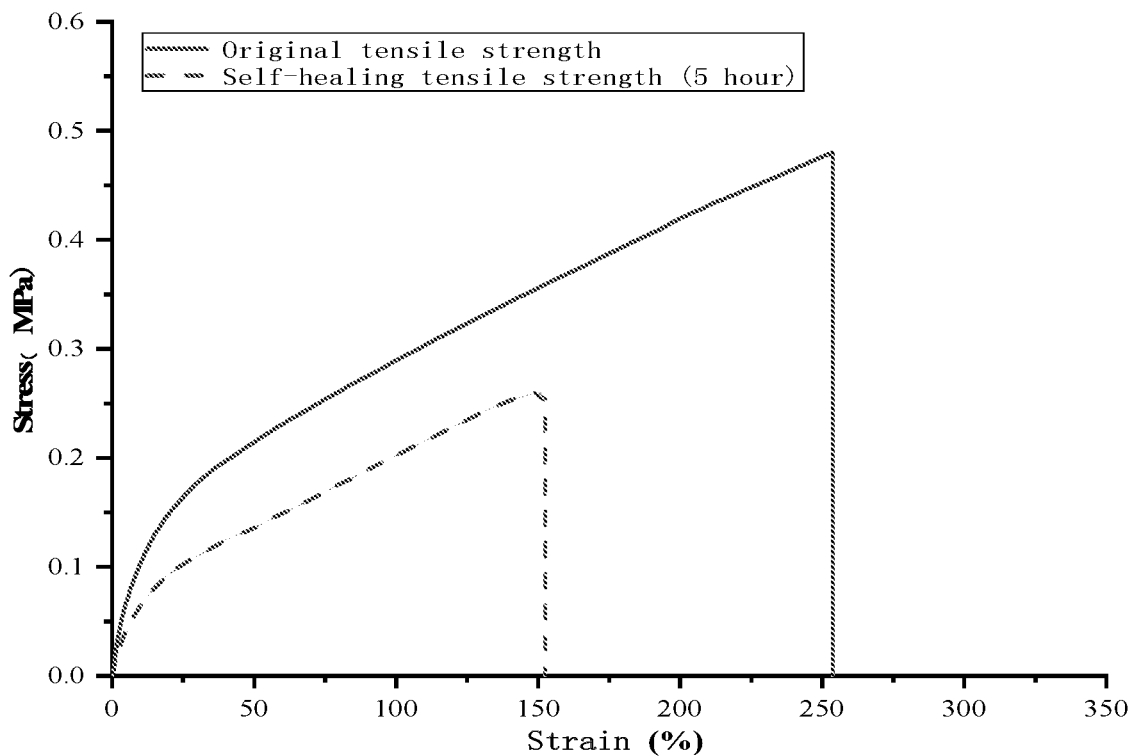

FIG. 5 is a graph showing the self-repairing tensile strength curve and the tensile strength curve after self-repairing of gel polymer S1.

Figure 6:
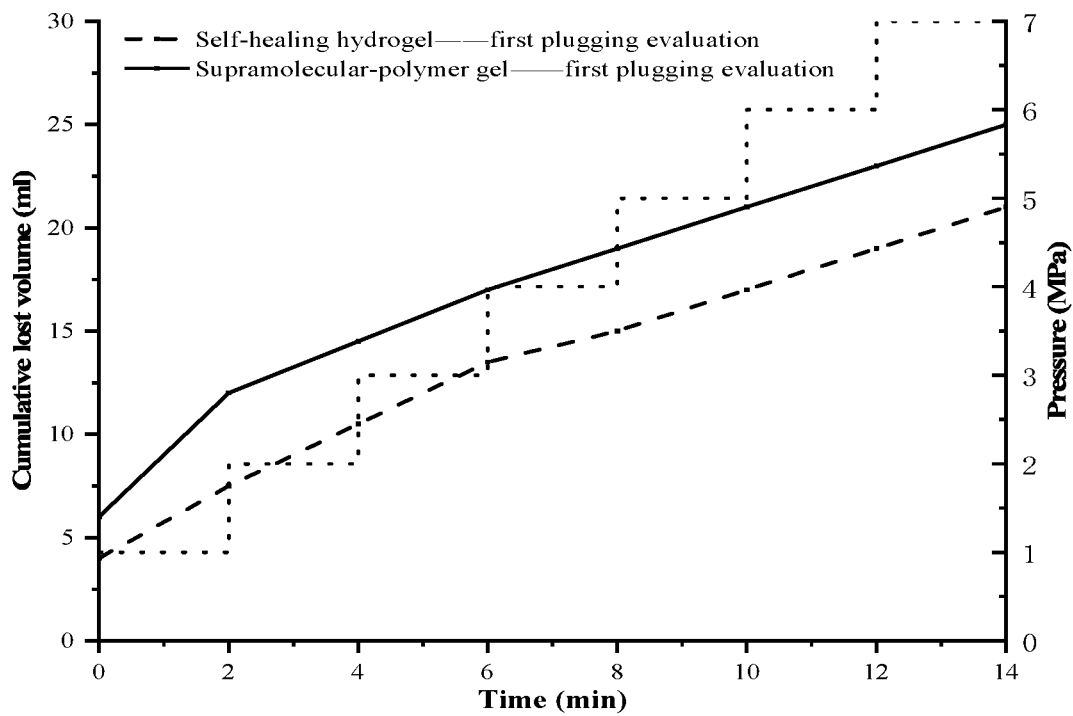

FIG. 6 is a primary leakage plugging evaluation graph of gel polymer S1 and a high molecular polymer plugging agent in a 20 μm quartz sand disc with a permeability of 50D.

Figure 7:
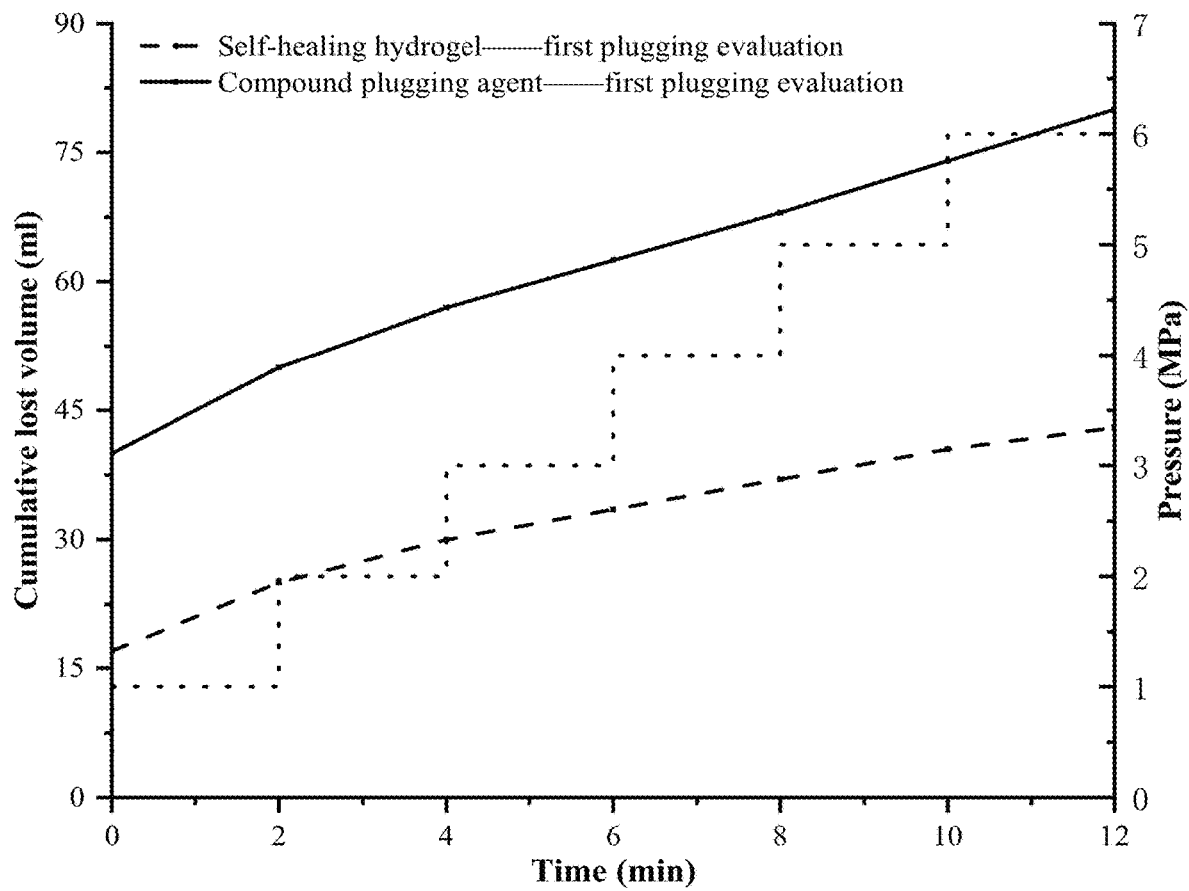

FIG. 7 is a primary leakage plugging evaluation graph of gel polymer S1 and the composite plugging agent in a 150 μm quartz sand disc with a permeability of 180D.

Figure 8:
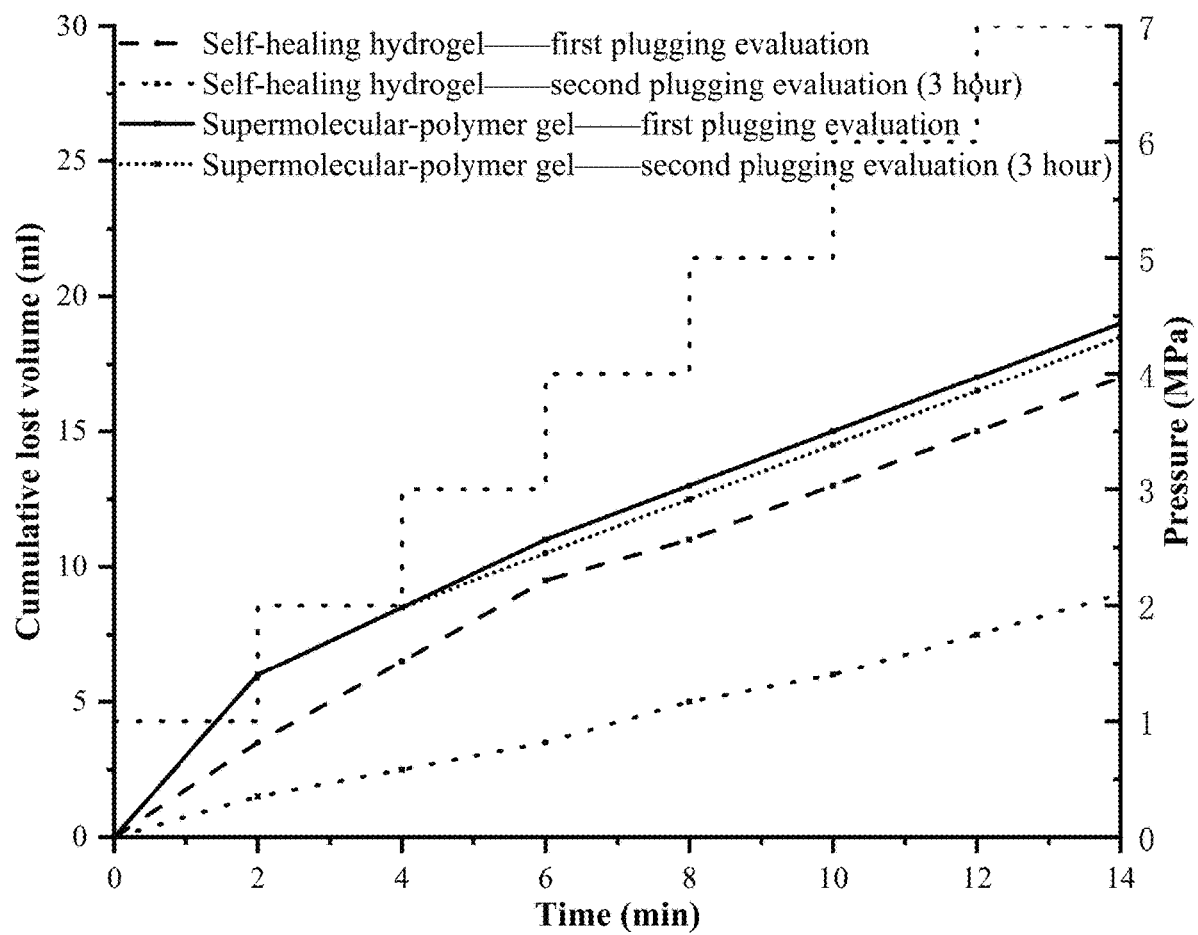

FIG. 8 is a repairing plugging evaluation curve graph of gel polymer S1 and a high molecular polymer plugging agent in a 20 μm quartz sand disc with a permeability of 50D.

Figure 9:
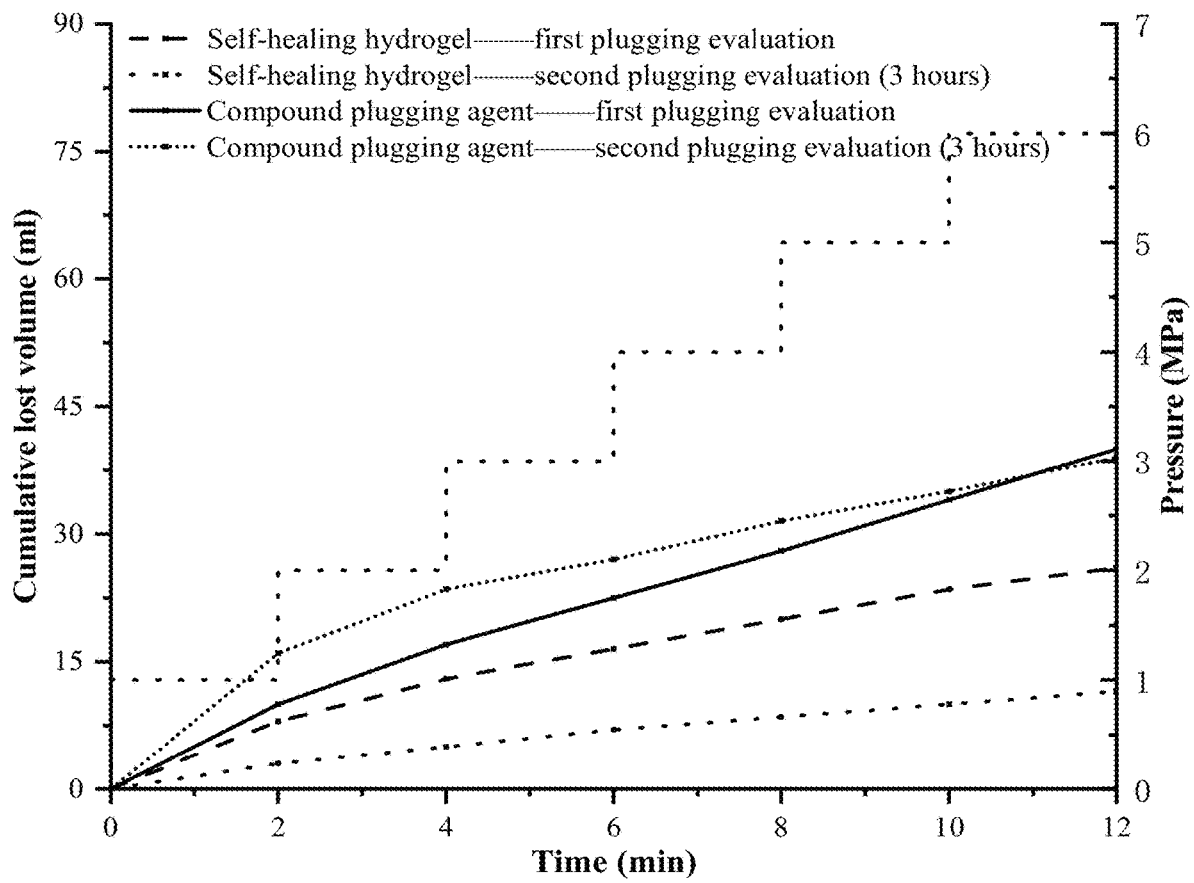

FIG. 9 is a repairing plugging evaluation curve graph of gel polymer S1 and the composite plugging agent in a 150 μm quartz sand disc with a permeability of 180D.

Figure 10:
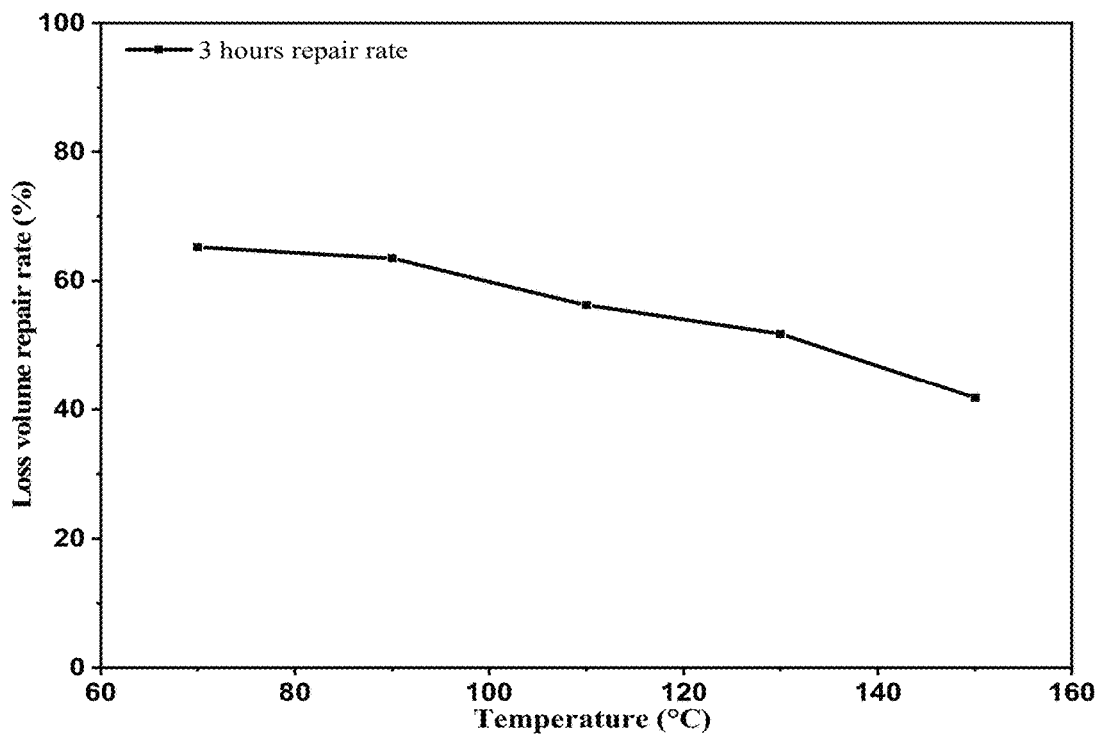

FIG. 10 is a graph of plugging repairing efficiency as a function of temperature for gel polymer S1 in a 150 μm quartz sand disc with a permeability of 180D.

Figure 11:
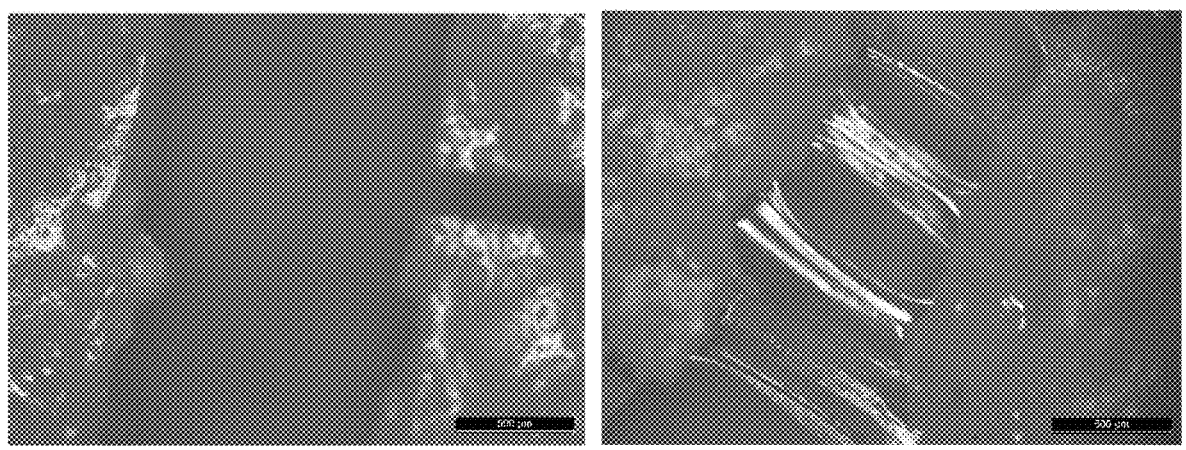

The left graph of FIG. 11 is a filter cake fracture graph of a base slurry of the water-based drilling fluid, and the right graph of FIG. 11 is a filter cake fracture graph of the water-based drilling fluid containing gel polymer S1.

Figure 12:
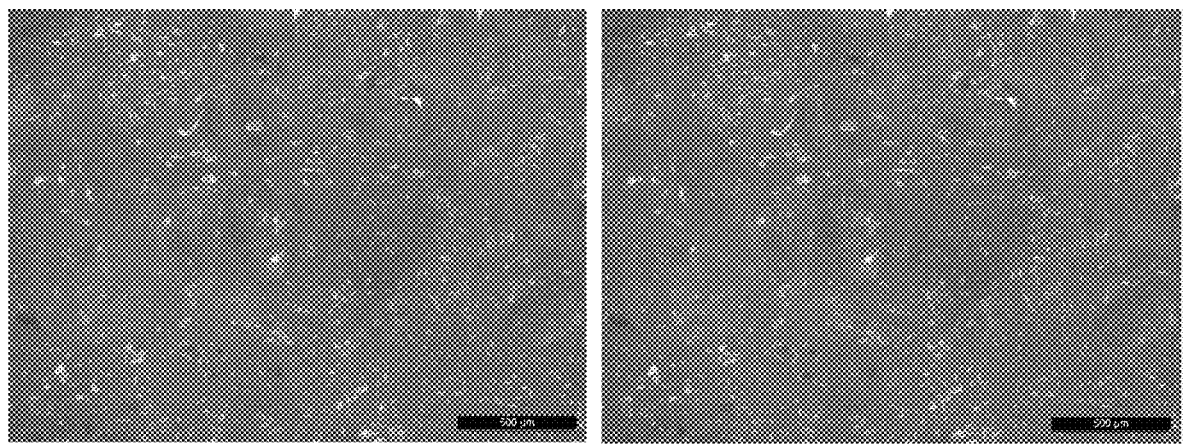

The left graph of FIG. 12 is a surface graph of a sand disc containing a base slurry of water-based drilling fluid, and the right graph of FIG. 12 is a surface graph of a sand disc containing water-based drilling fluid of gel polymer S1.

DETAILED DESCRIPTION

The endpoints of the ranges and any values disclosed herein are not limited to the precise range or value, and these ranges or values should be understood to encompass values close to these ranges or values. For numerical ranges, each range between its endpoints and individual point values, and each individual point value can be combined with each other to give one or more new numerical ranges, and such numerical ranges should be construed as specifically disclosed herein.

In the present invention, the $C_0$ alkylene means that it is absent and the groups at both ends of the group are directly linked; the $C_{1-3}$ alkylene means an alkylene having 1 to 3 carbon atoms. Integers from 1 to 3 include 1, 2 and 3.

In the present invention, the $C_{1-3}$ alkylene includes but is not limited to: methylene, ethylene, n-propylene, isopropylene.

In the present invention, the alkylene refers to a residue of an alkane which has been deprived of two hydrogen atoms, which may be two hydrogen atoms on the same carbon atom or two hydrogen atoms on different carbon atoms, and may be linear or branched, for example, the ethylene may be —$CH_2CH_2$— or —$CH(CH_3)$—.

In the present invention, the phenyl ring may be

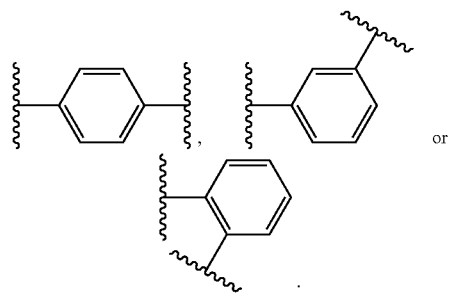

As mentioned above, the first aspect of the invention provides a self-repairing plugging gel polymer suitable for water-based drilling fluid, which contains a structural unit A, a structural unit B, a structural unit C and a structural unit D, the structural unit A is a structural unit with a structure shown in the formula (1); the structural unit B is a structural unit with a structure shown in the formula (2); the structural unit C is a structural unit with a structure shown in the formula (3); the structural unit D is a structural unit with a structure shown in the formula (4);

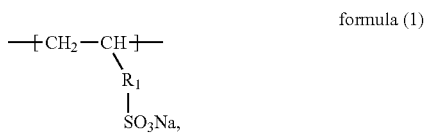

formula (1)

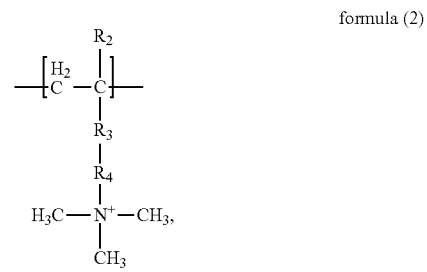

formula (2)

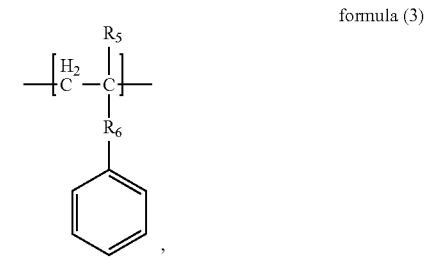

formula (3)

formula (4)

wherein,
in the formula (1), $R_1$ is selected from phenyl ring or $C_{1-3}$ alkylene;
in the formula (2), $R_2$ is selected from H or —$CH_3$, $R_3$ is selected from —CO—NH— or —CO—O—, and $R_4$ is selected from $C_{1-3}$ alkylene;
in the formula (3), $R_5$ is selected from H or —$CH_3$, $R_6$ is selected from $C_{1-3}$ alkylene;
in the formula (4), $R_7$ is selected from H or —$CH_3$, and $R_8$ is selected from phenyl ring or $C_0$ alkylene.

Further preferably, the structural unit A is selected from at least one of a structure shown by the formula (1-1), a structure shown by the formula (1-2), a structure shown by the formula (1-3) and a structural unit shown by the formula (1-4);

the structural unit B is at least one selected from a structure shown in the formula (2-1), a structure shown in the formula (2-2), a structure shown in the formula (2-3), a structure shown in the formula (2-4), a structure shown in the formula (2-5), a structure shown in the formula (2-6), a structure shown in the formula (2-7), a structure shown in the formula (2-8), a structure shown in the formula (2-9), a structure shown in the formula (2-10), a structure shown in the formula (2-11) and a structure shown in the formula (2-12); the structural unit C is at least one selected from a structure shown in the formula (3-1), a structure shown in the formula (3-2), a structure shown in the formula (3-3), a structure shown in the formula (3-4), a structure shown in the formula (3-5) and a structural unit shown in the formula (3-6);

the structural unit D is at least one selected from a structure shown in the formula (4-1), a structure shown in the formula (4-2), a structure shown in the formula (4-3) and a structural unit shown in the formula (4-4);

the formula (1-1): $R_1$ is a phenyl ring;
the formula (1-2): $R_1$ is —$CH_2$—;
the formula (1-3): $R_1$ is —$CH_2$—$CH_2$—;
the formula (1-4): $R_1$ is —$CH_2$—$CH_2$—$CH_2$—;
the formula (2-1): $R_2$ is H, $R_3$ is —CO—NH—, $R_4$ is —$CH_2$—;
the formula (2-2): $R_2$ is —$CH_3$, $R_3$ is —CO—NH—, and $R_4$ is —$CH_2$—;
the formula (2-3): $R_2$ is H, $R_3$ is —CO—O—, and $R_4$ is —$CH_2$—;
the formula (2-4): $R_2$ is —$CH_3$, $R_3$ is —CO—O—, and $R_4$ is —$CH_2$—;
the formula (2-5): $R_2$ is H, $R_3$ is —CO—NH—, $R_4$ is —$CH_2$—$CH_2$—;
the formula (2-6): $R_2$ is —$CH_3$, $R_3$ is —CO—NH—, $R_4$ is —$CH_2$—$CH_2$—;
the formula (2-7): $R_2$ is H, $R_3$ is —CO—O—, $R_4$ is —$CH_2$—$CH_2$—;
the formula (2-8): $R_2$ is —$CH_3$, $R_3$ is —CO—O—, $R_4$ is —$CH_2$—$CH_2$—;
the formula (2-9): $R_2$ is H, $R_3$ is —CO—NH—, $R_4$ is —$CH_2$—$CH_2$—$CH_2$—;
the formula (2-10): $R_2$ is —$CH_3$, $R_3$ is —CO—NH—, $R_4$ is —$CH_2$—$CH_2$—$CH_2$—;
the formula (2-11): $R_2$ is H, $R_3$ is —CO—O—, $R_4$ is —$CH_2$—$CH_2$—$CH_2$—;
the formula (2-12): $R_2$ is —$CH_3$, $R_3$ is —CO—O—, $R_4$ is —$CH_2$—$CH_2$—$CH_2$—;
the formula (3-1): $R_5$ is H, $R_6$ is —$CH_2$—;
the formula (3-2): $R_5$ is —$CH_3$, $R_6$ is —$CH_2$—;
the formula (3-3): $R_5$ is H, $R_6$ is —$CH_2$—$CH_2$—
the formula (3-4): $R_5$ is —$CH_3$, $R_6$ is —$CH_2$—$CH_2$—;
the formula (3-5): $R_5$ is H, $R_6$ is —$CH_2$—$CH_2$—$CH_2$—;
the formula (3-6): $R_5$ is —$CH_3$, $R_6$ is —$CH_2$—$CH_2$—$CH_2$—;
the formula (4-1): $R_7$ is H, $R_8$ is a phenyl ring;
the formula (4-2): $R_7$ is —$CH_3$, $R_8$ is a phenyl ring;
the formula (4-3): $R_7$ is H, $R_8$ is $C_0$ alkylene;
the formula (4-4): $R_7$ is —$CH_3$ and $R_8$ is a $C_0$ alkylene.

Preferably, the content molar ratio of the structural unit A, the structural unit B, the structural unit C and the structural unit D is 0.1 to 1:1 to 2:0.01 to 0.5:0.1 to 1. Further preferably, the content molar ratio of the structural unit A, the structural unit B, the structural unit C and the structural unit D is 0.3 to 0.7:1.8 to 2:0.1 to 0.3:0.3 to 0.7. In this preferred case, the gel polymer has a higher self-repairing property and more excellent mechanical properties.

As previously mentioned, the second aspect of the invention provides a method of making a self-repairing plugging gel polymer suitable for water-based drilling fluids, the method comprising:

carrying out polymerization reaction on each component in a polymerization combination in the presence of an alkaline substance and an initiator in an aqueous solvent and a protective atmosphere, wherein the polymerization combination contains a monomer A', a monomer B', a monomer C' and a monomer D';

the monomer A' is selected from monomers with a structure shown in the formula (I); the monomer B' is selected from monomers with a structure shown in the formula (II); the monomer C' is selected from monomers with a structure shown in the formula (II); the monomer D' is selected from monomers with a structure shown in the formula (IV);

the monomer A', the monomer B', the monomer C' and the monomer D' respectively enable the prepared polymer to contain a structural unit A, a structural unit B, a structural unit C and a structural unit D, and the structural unit A is a structural unit with a structure shown in the formula (1); the structural unit B is a structural unit with a structure shown in the formula (2); the structural unit C is a structural unit with a structure shown in the formula (3); the structural unit D is a structural unit with a structure shown in the formula (4);

formula (I)

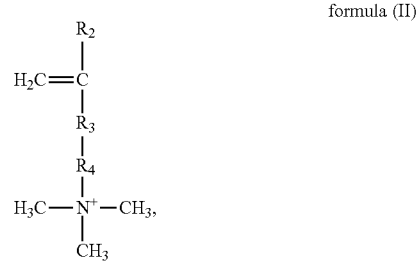

formula (II)

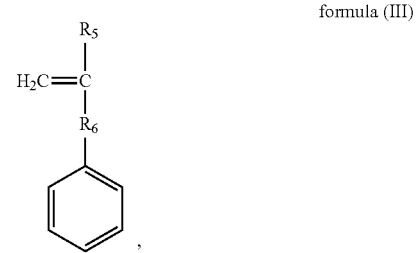

formula (III)

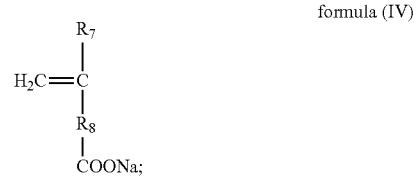

formula (IV)

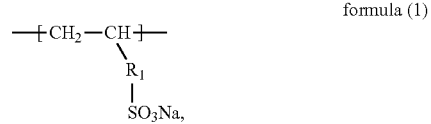

formula (1)

-continued

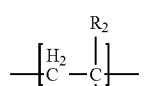

formula (2)

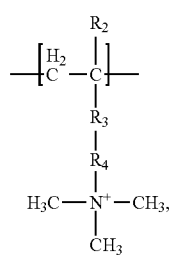

formula (3)

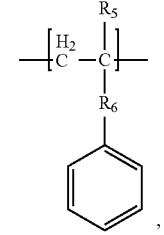

formula (4)

Wherein, $R_1$, $R_2$, $R_3$, $R_4$, $R_5$, $R_6$, $R_7$, $R_8$ are the same as the definitions of the first aspect.

In the method according to the second aspect of the invention, the definitions and species of the substituents in the monomer having the structure represented by the formula (I), the monomer having the structure represented by the formula (II), the monomer having the structure represented by the formula (III), and the monomer having the structure represented by the formula (IV) are the same as the definitions and species of the substituents described above in the present invention, and the present invention is not described herein again, and those skilled in the art should not be construed as limiting the technical scope of the present invention.

In the present invention, the monomer A', the monomer B', the monomer C' and the monomer D' may be obtained commercially, or may be synthesized according to the structural formula provided by the present invention in combination with a known method in the field of organic synthesis.

In the present invention, it should be noted that the monomer is converted into the corresponding structural unit contained in the polymer approximately completely, and the amount of the monomer used may be the same as the content of the corresponding structural unit contained in the polymer.

Preferably, the monomer A', the monomer B', the monomer C' and the monomer D' are used in such an amount that the content molar ratio of the structural unit A, the structural unit B, the structural unit C and the structural unit D in the prepared polymer is 0.1 to 1:1 to 2:0.01 to 0.5:0.1 to 1. Further preferably, the monomer A', the monomer B', the monomer C' and the monomer D' are used in such an amount that the content molar ratio of the structural unit A, the structural unit B, the structural unit C and the structural unit D in the prepared polymer is 0.3 to 0.7:1.8 to 2:0.1 to 0.3:0.3 to 0.7.

According to a preferred embodiment, the total molar amount of monomer having the structure represented by the formula (I), monomer having the structure represented by the formula (II), monomer having the structure represented by the formula (III) and monomer having the structure represented by the formula (IV) is 0.8 mol to 1.5 mol, more preferably 1.1 mol to 1.35 mol, relative to 100 g of the aqueous solvent. Under the preferable condition, the prepared gel polymer has better plugging performance and higher repairing efficiency of a plugging layer when being used as a plugging agent for water-based drilling fluid.

In the present invention, the aqueous solvent may be water alone or a mixture of water miscible with some solvents that do not affect the reaction of the present invention, and the present invention is not described in detail herein.

In the present invention, the protective atmosphere may be at least one of nitrogen, helium, neon, and argon, for example.

Preferably, the alkaline substance is at least one selected from the group consisting of lithium hydroxide, sodium hydroxide, potassium carbonate, sodium carbonate, and sodium bicarbonate.

Preferably, the initiator is selected from at least one of azo-type initiators, peroxide-type initiators, and redox-type initiators; the azo-type initiator is selected from at least one of azodiisobutyramidine hydrochloride, azodiisopropylimidazoline hydrochloride, azodicyanovaleric acid and azodiisopropylimidazoline; the peroxide-type initiator is at least one selected from hydrogen peroxide, ammonium persulfate, sodium persulfate and potassium persulfate; the redox-type initiator is at least one selected from persulfate-sulfite, persulfate-thiourea and persulfate-organic salt.

Preferably, the conditions of the polymerization reaction at least satisfy: the pH value is 7 to 9, the temperature is 20° C. to 90° C., and the time is 3 h to 15 h. More preferably, the conditions of the polymerization reaction at least satisfy: the pH value is 7 to 9, the temperature is 50° C. to 80° C., and the time is 8 h to 12 h. Wherein, the pH value of 7 to 9 means that the polymerization reactions are all carried out under such conditions.

Preferably, the amount of the initiator is 0.1 mmol to 10 mmol, based on 1 mol of the total molar amount of the monomer A', the monomer B', the monomer C' and the monomer D'; preferably 0.5 mmol to 5 mmol, more preferably 1 mmol to 3 mmol. The inventor of the invention finds that when the total molar amount of 1 mol of the monomer A', the monomer B', the monomer C' and the monomer D' is taken as a reference, and the using amount of the initiator is 1 mmol to 3 mmol, the prepared gel polymer has higher high-temperature resistance when being used as a plugging agent for water-based drilling fluid.

In the present invention, according to another preferred embodiment, the preparation method of the gel polymer comprises the steps of:
(1) under the condition of stirring, carrying out first mixing on the monomer A' and the monomer D' with an aqueous solvent at the temperature of 10° C. to 40° C. for 10 min to 30 min, and adjusting the pH value to 7 to 9 to obtain a first mixture;
(2) mixing the monomer B' and the monomer C' with the first mixture, and performing second mixing for 10 min to 60 min at the temperature of 10° C. to 50° C. to obtain a second mixture;
(3) introducing a protective atmosphere into the second mixture, adding an initiator into the mixed system, and carrying out polymerization reaction for 8 h to 12 h at the temperature of 50° C. to 80° C. to obtain a solution containing the gel polymer.

In order to be able to obtain the gel polymer of the invention in solid form, the process preferably further comprises: drying the solution containing the gel polymer. The drying conditions may include, for example: the temperature is 70° C. to 100° C., and the time is 20 h to 60 h.

In the present invention, the drying method is not particularly limited, and various drying methods which are generally used in the art may be used, and examples thereof include an oven drying method, a freeze drying method, a supercritical drying method, and a spray drying method.

As previously mentioned, the third aspect of the present invention provides a self-repairing plugging gel polymer suitable for water-based drilling fluids made by the method of the second aspect.

The present invention is not particularly limited, and the polymer may be one of the polymers prepared by the method of the second aspect, or a mixture of a plurality of the polymers. It is to be understood that the polymer produced by the above process is generally referred to as the direct product of the above process without purification (or after only the drying), and although such a product may be a mixture of a plurality of polymers, the present invention also includes such a situation within the scope of the present invention.

As previously mentioned, the fourth aspect of the present invention provides the use of the self-repairing plugging gel polymers suitable for water-based drilling fluids of the first and the third aspects as a plugging agent in drilling fluids.

When the polymer is applied to the drilling fluid as a plugging agent, the obtained drilling fluid can still keep lower filtration loss in a high-temperature environment, and well wall stability is well maintained, so that the polymer is particularly suitable for developing ultra-deep layer oil and gas resources in the high-temperature environment.

As mentioned above, the fifth aspect of the present invention provides a drilling fluid containing the self-repairing plugging gel polymer of the first and the third aspects as a plugging agent.

In the present invention, the content of the polymer in the drilling fluid is not particularly limited, but in order to obtain a drilling fluid with better performance, the content of the polymer in the drilling fluid is preferably 0.5% to 2.5% by weight.

In the present invention, the drilling fluid system is not particularly limited, and may be any of various drilling fluid systems known in the art.

Preferably, the drilling fluid is a water-based drilling fluid, and additives are also contained in the water-based drilling fluid.

Further preferably, the additive includes bentonite, tackifier, anti-collapse agent, lubricant and sodium carbonate.

In the present invention, the bentonite is clay having montmorillonite as a main mineral component, which has an effect of imparting viscous shear force and filtrate loss wall-building property to drilling fluid, and may be, for example, sodium bentonite and/or calcium bentonite, and preferably sodium bentonite.

In the present invention, the tackifier is a substance capable of increasing the viscous shear force of the drilling fluid, and may be at least one of polyacrylamide potassium salt (KPAM), polyanionic cellulose (e.g., PAC141), and a copolymer of acrylamide and sodium acrylate (e.g., 80A51), and is preferably polyacrylamide potassium salt.

In the present invention, the anti-collapse agent is a substance capable of assisting the biomimetic shale inhibitor to prevent the well wall from collapsing and improve the stability of the well wall, and may be at least one of potassium humate (KHM), organic silicon (e.g., GF-1) and sulfonated asphalt (e.g., FT-1A), and is preferably potassium humate.

In the present invention, the lubricant is a substance capable of improving the lubricating property of the drilling fluid and preventing the down hole complication such as stuck drilling, and may be at least one of sulfonated oil bottoms (e.g., FK-10), diesel oil and surfactant mixture (e.g., FRH), and fatty acid glyceride and surfactant mixture (e.g., FK-1), and preferably FK-10.

Preferably, in the drilling fluid, relative to 100 parts by weight of water, the content of the bentonite is 2 wt % to 4 wt %, the content of the tackifier is 0.2 wt % to 0.5 wt %, the content of the anti-collapse agent is 2 wt % to 4 wt %, the content of the lubricant is 2 wt % to 4 wt %, and the content of the sodium carbonate is 0.2 wt % to 0.3 wt %.

Further preferably, in the drilling fluid, relative to 100 parts by weight of water, the content of the bentonite is 3 wt % to 4 wt %, the content of the tackifier is 0.3 wt % to 0.5 wt %, the content of the anti-collapse agent is 2 wt % to 4 wt %, the content of the lubricant is 2 wt % to 4 wt %, and the content of the sodium carbonate is 0.2 wt % to 0.3 wt %.

In the present invention, the above-mentioned additives may be commercially available products or may be prepared according to methods known in the art, and the details of the present invention are not repeated.

In the present invention, there is no particular limitation on the preparation method of the drilling fluid, and the preparation method known to those skilled in the art can be adopted, and the present invention is not described herein in detail, and the present invention is exemplified by a specific operation hereinafter, and those skilled in the art should not be construed as limiting the present invention.

In the present invention, the amount of the polymer is not particularly limited, and when the amount is used, the amount is based on the dry amount of the polymer.

The present invention will be described in detail below by way of examples. In the following examples, all the raw materials used are commercially available unless otherwise specified.

In the following examples, the test methods for the properties involved are as follows: in the following examples, the formulation of the water-based drilling fluid was: 100 parts by weight of a water-based drilling fluid base slurry, 2 parts by weight of a gel polymer, 0.4 part by weight of KPAM (tackifier)+3 parts by weight of KHM (anti-collapse agent)+3 parts by weight of FK-10 (lubricant)+1 part by weight of sodium chloride.

The preparation process of the water-based drilling fluid base slurry comprises the following steps: sequentially adding 4 parts by weight of bentonite and 0.25 part by weight of sodium carbonate into 100 parts by weight of water, stirring for 10 min by using a high-speed stirrer after each addition of one raw material until the raw materials are uniformly dispersed, wherein the stirring speed is 10000 rpm, and stirring for 24 h to obtain the base slurry of the water-based drilling fluid.

1. Evaluation of plugging performance of the water-based drilling fluid: the method adopts a high-temperature high-pressure water loss instrument to determine the leakage amount of the water-based drilling fluid containing the gel polymer, and comprises the following specific processes:

evaluation of the primary plugging performance: the water-based drilling fluid is stirred uniformly and poured into a high-temperature high-pressure water loss instrument, the temperature is set to be 90° C., the pressure is gradually increased by nitrogen (the pressure is increased from 0 MPa to 6 MPa (150 μm) or 7 MPa (20 μm) at the speed of 1 MPa/2 min), and the instantaneous leakage volume ($V_0$) and the first cumulative leakage volume (the cumulative leakage volume 2 min after the test is started) in a permeable sand disc with the pore throat diameter of 20 μm (the mercury pressure permeability is 50D) and 150 μm (the mercury pressure permeability is 180D) are respectively measured.

evaluation of the secondary plugging performance: after the evaluation of the primary plugging performance, the instrument is kept in a pressure-holding state at 90° C. for 3 h, the pressure is gradually increased by using nitrogen (the pressure is increased from 0 MPa to 6 MPa at the rate of 1 MPa/2 min), and the second cumulative leakage volume is measured.

The leakage repair rate of the plugging layer is calculated through the first cumulative leakage volume and the second cumulative leakage volume. The calculation formula of the secondary plugging layer repairing efficiency (leakage volume reduction rate LVRR) is as follows:

$$LVRR = \frac{V_1 - V_2}{V_1}$$

LVRR—the secondary plugging layer repair efficiency, %;
$V_0$—the instantaneous leakage volume, mL;
$V_1$—the first cumulative leakage volume, except for the instantaneous leakage volume, mL;
$V_2$—the second cumulative leakage volume, mL.

2. High-temperature resistance performance test of the water-based drilling fluid: adding the water-based drilling fluid into a high-temperature high-pressure water loss instrument, setting the temperature of the instrument to 70° C., 90° C., 110° C., 130° C., 150° C., respectively. Measuring the instantaneous leakage volume, the first cumulative leakage volume and the second cumulative leakage volume of the drilling fluid slurry by adopting a 150 μm ceramic sand disc.

3. Tensile resistance performance test of the gel polymer: adopting an electronic universal testing machine WH-5000 to carry out a tensile test, and measuring the tensile strength $\sigma_0$ of the gel polymer;

cutting the same gel polymer into two halves from the center, measuring the tensile strength $\sigma_1$ of the repaired gel polymer again after repairing; the self-repairing efficiency of the gel polymer is calculated according to the following formula:

$$\eta = \sigma_1/\sigma_0 \times 100\%$$

η—self-repairing efficiency, %;
$\sigma_1$—tensile strength after cutting off and self-repairing, MPa;
$\sigma_0$—tensile strength without cutting, MPa.

In the following examples, each part by weight means 4 g unless otherwise specified.

EXAMPLE 1

(1) Adding 0.5 mol of the monomer A' and 0.5 mol of the monomer D' into a three-neck flask containing 50 g of distilled water, heating in water bath at 25° C., stirring until the monomers are uniformly mixed, and adjusting the pH value to 7, wherein the monomer A' has a structure shown in the formula (I), and $R_1$ is

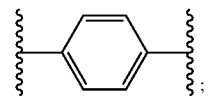 [SMILES: *c1ccc(*)cc1]

the monomer D' has a structure shown in the formula (IV), wherein $R_7$ is H, and $R_8$ is

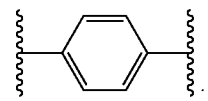

(2) Adding 0.1 mol of the monomer C' and 1 mol of the monomer B' into the aqueous solution obtained in the step (1), heating in a water bath at 25° C., and stirring until the monomers are uniformly mixed, wherein the monomer B' has a structure shown in the formula (II), and $R_2$ is —$CH_3$, $R_3$ is —CO—NH— (wherein the C atom is connected with $R_4$), and $R_4$ is —$CH_2$—$CH_2$—$CH_2$—; the monomer C' has a structure shown in the formula (III), and $R_5$ is H, and $R_6$ is —$CH_2$—.

(3) After the addition is finished, sealing the three-neck flask, adding a nitrogen introducing device to introduce nitrogen into the three-neck flask, adding an initiator, fully removing air in the flask, heating to 70° C., performing constant-temperature polymerization reaction for 12 h, and cooling to room temperature after the reaction is finished to obtain the gel polymer S1.

In the preparation process of the gel polymer S1, the total molar amount of the monomers A', B', C' and D' is 1 mol, and the amount of the initiator is 3 mmol.

EXAMPLES 2 TO 7

A gel polymer was prepared in a similar manner to example 1, except that: the gel polymers S2, S3, S4, S5, S6 and S7 were obtained in the same manner as in example 1, except that the kind of the monomer A' or the monomer B' used was different, specifically:

EXAMPLE 2

The same molar amount of the monomer A' having the structure represented by the formula (I), wherein $R_1$ is —$CH_2$— was used in place of the monomer A' in example 1, and the same molar amount of the monomer B' having the structure represented by the formula (II), wherein $R_2$ is —$CH_3$, $R_3$ is —CO—O— (wherein the C atom is connected with $R_4$) and $R_4$ is —$CH_2$—$CH_2$—$CH_2$— was used in place of the monomer B' in example 1 to obtain the gel polymer S2.

EXAMPLE 3

The same molar amount of the monomer A' of example 1 was replaced with the same molar amount of the monomer A' having the structure represented by the formula (I), wherein $R_1$ is —$CH_2$—$CH_2$—, and the same molar amount of the monomer B' of example 1 was replaced with the same molar amount of the monomer B' having the structure represented by the formula (II), wherein $R_2$ is —$CH_3$, $R_3$ is —CO—O— (wherein the C atom is connected with $R_4$) and $R_4$ is —$CH_2$—$CH_2$— to obtain the gel polymer S3.

EXAMPLE 4

The gel polymer S4 was obtained by substituting the monomer B' of example 1 with the same molar amount of the monomer B' having a structure represented by formula (II), wherein $R_2$ is —$CH_3$, $R_3$ is —CO—NH— (wherein the C atom is connected with $R_4$) and $R_4$ is —$CH_2$—$CH_2$—.

EXAMPLE 5

The same molar amount of the monomer A' of example 1 was replaced with the same molar amount of the monomer A' having the structure represented by the formula (I), wherein $R_1$ is—$CH_2$—$CH_2$—$CH_2$—, and the same molar amount of the monomer B' of example 1 was replaced with the same molar amount of the monomer B' having the structure represented by the formula (II), wherein $R_2$ is —$CH_3$, $R_3$ is —CO—O— (wherein the C atom is connected with $R_4$) and $R_4$ is —$CH_2$— to obtain the gel polymer S5.

EXAMPLE 6

The gel polymer S6 was obtained by substituting the monomer B' of example 1 with the same molar amount of the monomer B' having a structure represented by the formula (II), wherein $R_2$ is —$CH_3$, $R_3$ is —CO—NH— (wherein the C atom is connected with $R_4$) and $R_4$ is —$CH_2$—.

EXAMPLE 7

The gel polymer S7 was obtained by substituting the monomer B' of example 1 with the same molar amount of the monomer B having a structure represented by the formula (II), wherein $R_2$ is H, $R_3$ is —CO—NH— (wherein the C atom is connected with $R_4$) and $R_4$ is —$CH_2$—.

Comparative Example 1

This comparative example was conducted in a similar manner to example 1 except that the monomer having the structure represented by the formula (II), that is, no monomer B' in example 1 was added to obtain the gel polymer DS1.

Test Example

1. Performance Test

According to the above method, each example and 2 commonly used plugging agents in the current market are prepared into water-based drilling fluids, which are respectively marked as L1 (the plugging agent correspondingly applied is the gel polymer S1 obtained in example 1), L2, L3, L3, L5, L6, DL1 (the plugging agent correspondingly applied is the gel polymer DS1 obtained in comparative example 1), DL2 (the plugging agent correspondingly applied is the composite plugging agent (the product brand is TDL-1 and is purchased from Tianjin TianchengTuoyuan technology development Co., Ltd.), DL3 (the plugging agent correspondingly applied is the high-molecular polymer plugging agent (the product brand is SDG-1 and is purchased from Tianjin TianchengTuoyuan technology development Co., Ltd.), and the water-based drilling fluids containing gel polymers are tested for primary plugging performance, secondary plugging performance, high-temperature resistance performance and tensile resistance performance of gel polymers. The specific results are shown in table 1, table 2 and table 3 respectively.

Figure 1:
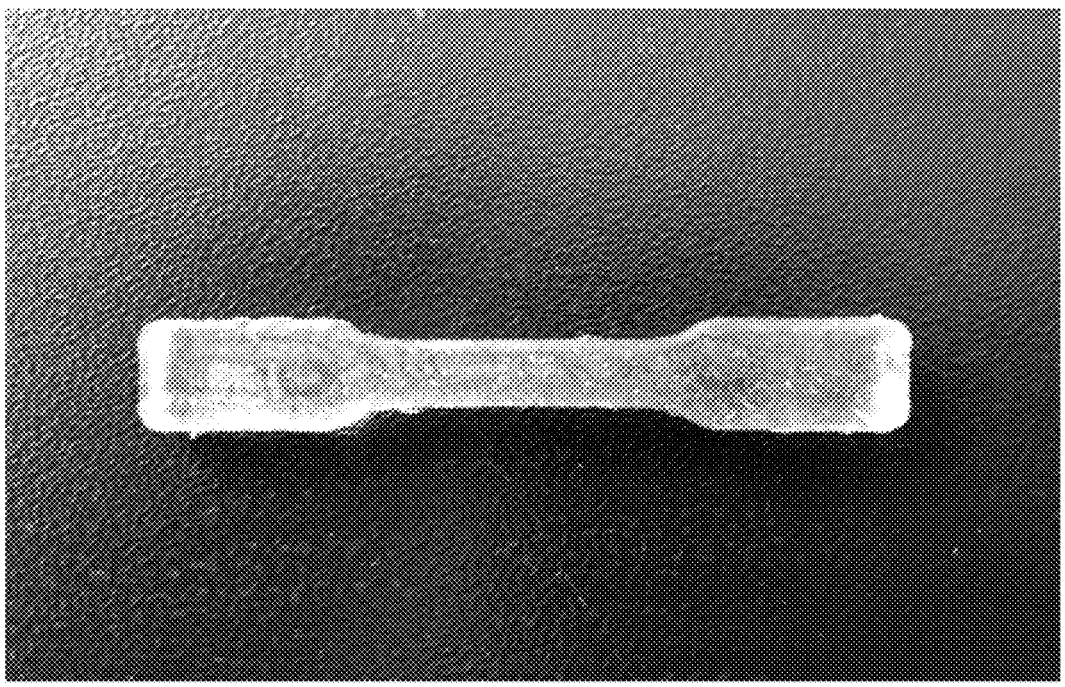
FIG. 1 is a sample graph of gel Polymer S1.

FIG. 1 is a sample graph of gel polymer S1. As can be seen from FIG. 1, the self-repairing gel polymer is in a semi-transparent dumbbell shape and has certain mechanical strength.

Figure 2:
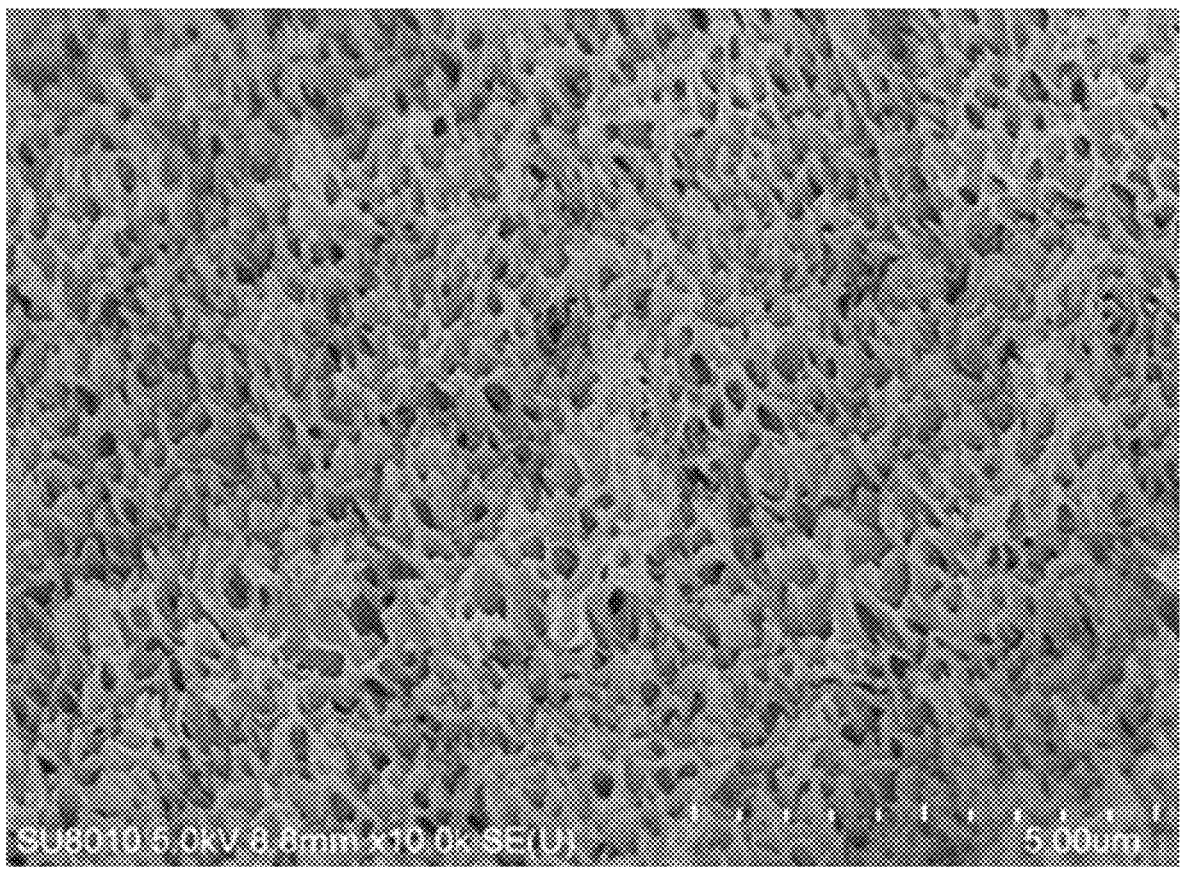
FIG. 2 is a network structure graph of gel polymer S1.

FIG. 2 is a network structure graph of gel polymer S1. As can be seen from FIG. 2, the self-repairing gel polymer has a honeycomb-shaped network inside, which indicates that a plurality of cross-linking bonding points exist inside the self-repairing gel polymer, and the gel polymer is formed by water absorption of the polymer network.

FIG. 5 is a graph showing the self-repairing tensile strength curve and the tensile strength curve after self-repairing of gel polymer S1. As can be seen from FIG. 5, the gel polymer S1 has high toughness and good self-repairing performance, so that the gel polymer S1 can have good plugging performance and pressure-bearing capacity when being used as a plugging agent.

FIG. 6 is a primary leakage plugging evaluation graph of gel polymer S1 and a high molecular polymer plugging agent in a 20 μm quartz sand disc with a permeability of 50D. As can be seen from FIG. 6, the instantaneous leakage volume and the cumulative leakage volume at 7 MPa of the gel polymer S1 are reduced compared with those of the high-molecular polymer plugging agent, which indicates that the gel polymer S1 has a better plugging effect.

FIG. 7 is a primary leakage plugging evaluation graph of gel polymer S1 and the composite plugging agent in a 150 μm quartz sand disc with a permeability of 180D. As can be seen from FIG. 7, the gel polymer S1 has better plugging effect compared with the composite plugging agent.

FIG. 8 is a repairing plugging evaluation curve graph of gel polymer S1 and a high molecular polymer plugging agent in a 20 μm quartz sand disc with a permeability of 50D. As can be seen from FIG. 8, the plugging layer constructed by the gel polymer S1 has better repairing capability, while the plugging layer constructed by the high molecular polymer plugging agent does not have repairing capability.

FIG. 9 is a repairing plugging evaluation curve graph of gel polymer S1 and the composite plugging agent in a 150 μm quartz sand disc with a permeability of 180D. As can be seen from FIG. 9, the plugging layer constructed by the gel polymer S1 has better repairing capability, while the plugging layer constructed by the composite plugging agent has no repairing capability.

FIG. 10 is a graph of plugging repairing efficiency as a function of temperature for gel polymer S1 in a 150 μm quartz sand disc with a permeability of 180D. As can be seen from FIG. 10, the gel polymer S1 has better repairing efficiency under various temperature conditions in a 150 μm quartz sand disc with a permeability of 180D. As the temperature increases, the LVRR value gradually decreases and the repairing efficiency gradually gets worse.

The left graph of FIG. 11 is a filter cake fracture graph of a base slurry of the water-based drilling fluid, and the right graph of FIG. 11 is a filter cake fracture graph of the water-based drilling fluid containing gel polymer S1. As can be seen from FIG. 11, the surfaces of the cracks of the filter cake formed by the gel polymer S1 show that the gel polymer S1 has consolidation and adsorption effects on the filter cake after being softened at high temperature in the base slurry, which is beneficial to the establishment of a high-density plugging layer.

The left graph of FIG. 12 is a surface graph of a sand disc containing a base slurry of water-based drilling fluid, and the right graph of FIG. 12 is a surface graph of a sand disc containing water-based drilling fluid of gel polymer S1. As can be seen from FIG. 12, the gel polymer S1 can enter the sand disc pores after being softened at a high temperature in the base slurry, and forms a shape adapted to the sand disc pore cracks, and has good applicability to the formation conditions where the shape and size of the underground cracks are difficult to predict and cannot be predicted.

TABLE 1

| Number of water-based drilling fluid | $V_0$ (mL) 20 µm | $V_0$ (mL) 150 µm | $V_1$ (mL) 20 µm | $V_1$ (mL) 150 µm | $V_2$ (mL) 20 µm | $V_2$ (mL) 150 µm | LVRR (%) 20 µm | LVRR (%) 150 µm |
|---|---|---|---|---|---|---|---|---|
| L1 | 4 | 17 | 17 | 26 | 8 | 14.5 | 52.9 | 44.2 |
| L2 | 4 | 18 | 32.9 | 63.6 | 22.5 | 39.1 | 31.6 | 38.5 |
| L3 | 5 | 21 | 35.2 | 65.4 | 25.3 | 42.9 | 28.1 | 34.4 |
| L4 | 4 | 18 | 28.2 | 60.1 | 15.5 | 27.1 | 45.0 | 54.9 |
| L5 | 6 | 24 | 45.2 | 85.4 | 36.3 | 64.9 | 19.7 | 24.0 |
| L6 | 4 | 18 | 29.4 | 63.6 | 16.7 | 30.5 | 43.2 | 52.0 |
| L7 | 5 | 22 | 41.6 | 72.2 | 33.4 | 54.8 | 19.7 | 24.1 |
| DL1 | 8 | 34 | 58.7 | 120.8 | 55.7 | 114.7 | 5.1 | 5.0 |
| DL2 | 6 | / | 19 | / | 18.5 | / | 2.6 | / |
| DL3 | / | 40 | / | 40 | / | 39 | / | 2.5 |

TABLE 2

| Number of water-based drilling fluid | Test conditions (° C.) | $V_0$ With polymer | $V_0$ No polymer | $V_1$ With polymer | $V_1$ No polymer | $V_2$ With polymer | $V_2$ No polymer | LVRR With polymer | LVRR No polymer |
|---|---|---|---|---|---|---|---|---|---|
| L1 | 70  | 14  | all lost | 23   | / | 8    | / | 65.2 | / |
|    | 90  | 17  | all lost | 26   | / | 11   | / | 57.7 | / |
|    | 110 | 20  | all lost | 32   | / | 14   | / | 56.3 | / |
|    | 130 | 25  | all lost | 56   | / | 27   | / | 51.8 | / |
|    | 150 | 28  | all lost | 61   | / | 35.5 | / | 41.8 | / |
| L2 | 70  | 22  | all lost | 36.5 | / | 11.5 | / | 68.5 | / |
|    | 90  | 26  | all lost | 41.3 | / | 15.9 | / | 61.5 | / |
|    | 110 | 31  | all lost | 50.8 | / | 20.2 | / | 60.2 | / |
|    | 130 | 39  | all lost | 88.9 | / | 39.1 | / | 56.0 | / |
|    | 150 | 44  | all lost | 96.8 | / | 51.4 | / | 46.9 | / |
| L3 | 70  | 24  | all lost | 39.7 | / | 13.1 | / | 67.0 | / |
|    | 90  | 29  | all lost | 44.8 | / | 18.0 | / | 59.8 | / |
|    | 110 | 34  | all lost | 55.2 | / | 22.9 | / | 58.5 | / |
|    | 130 | 43  | all lost | 96.6 | / | 44.2 | / | 54.2 | / |
|    | 150 | 48  | all lost | —    | / | —    | / | —    | / |
| L4 | 70  | 19  | all lost | 31.5 | / | 8.1  | / | 74.3 | / |
|    | 90  | 23  | all lost | 35.6 | / | 11.2 | / | 68.5 | / |
|    | 110 | 27  | all lost | 43.8 | / | 14.2 | / | 67.6 | / |
|    | 130 | 34  | all lost | 76.7 | / | 27.5 | / | 64.1 | / |
|    | 150 | 38  | all lost | 83.6 | / | 36.2 | / | 56.7 | / |
| L5 | 70  | 33  | all lost | 54.8 | / | 18.6 | / | 66.1 | / |
|    | 90  | 40  | all lost | 61.9 | / | 25.5 | / | 58.8 | / |
|    | 110 | 47  | all lost | 76.2 | / | 32.5 | / | 57.3 | / |
|    | 130 | 59  | all lost | —    | / | —    | / | —    | / |
|    | 150 | 66  | all lost | —    | / | —    | / | —    | / |
| L6 | 70  | 20  | all lost | 33.3 | / | 8.6  | / | 74.2 | / |
|    | 90  | 24  | all lost | 37.7 | / | 11.8 | / | 68.7 | / |
|    | 110 | 28  | all lost | 46.4 | / | 15.0 | / | 67.7 | / |
|    | 130 | 36  | all lost | 81.2 | / | 29.0 | / | 64.3 | / |
|    | 150 | 40  | all lost | 88.4 | / | 38.1 | / | 56.9 | / |
| L7 | 70  | 28  | all lost | 46.0 | / | 18.6 | / | 59.6 | / |
|    | 90  | 34  | all lost | 52.0 | / | 25.5 | / | 51.0 | / |
|    | 110 | 40  | all lost | 64.0 | / | 32.5 | / | 49.2 | / |
|    | 130 | 50  | all lost | —    | / | —    | / | —    | / |
|    | 150 | 56  | all lost | —    | / | —    | / | —    | / |
| DL1 | 70  | 66  | all lost | —   | / | —    | / | —    | / |
|     | 90  | 80  | all lost | —   | / | —    | / | —    | / |
|     | 110 | 95  | all lost | —   | / | —    | / | —    | / |
|     | 130 | 119 | all lost | —   | / | —    | / | —    | / |
|     | 150 | 133 | all lost | —   | / | —    | / | —    | / |

Note:
The instantaneous leakage volumes greater than 50 mL were not evaluated for the next first cumulative fluid leakage volume. The first cumulative fluid leakage volumes more than 100 mL were not evaluated for the repairing efficiency. 2 common plugging agents DL2 and DL3commonly used in the market are not subjected to high temperature resistance performance test.

TABLE 3

| Number of gel polymer | $\sigma_0$ (MPa) | $\sigma_1$ (MPa) | $\eta$ (%) |
|---|---|---|---|
| S1 | 0.48 | 0.28 | 58.3 |
| S2 | 0.3 | 0.12 | 40.0 |
| S3 | 0.28 | 0.1 | 35.7 |
| S4 | 0.35 | 0.2 | 57.1 |
| S5 | 0.2 | 0.05 | 25.0 |
| S6 | 0.33 | 0.18 | 54.5 |
| S7 | 0.24 | 0.06 | 25.0 |
| DS1 | 0.1 | 0 | 0 |

For the water-based drilling fluid above, the higher the LVRR value is, the higher the secondary plugging repairing efficiency of the plugging layer is. When the LVRR value is close to 0, the plugging layer is not provided with repairing ability; a negative LVRR value indicates that the plugging layer has not been established.

As can be seen from the above results, the gel polymer provided by the invention has excellent mechanical property and plugging property, and has good plugging effect and higher repairing efficiency of the plugging layer when being used for water-based drilling fluid, and also has better high temperature resistance performance.

Specifically, it can be seen from the results of table 1 that the secondary plugging repairing efficiency of the plugging layer is between 19.7 and 55.8 when the gel polymer of the present invention is used as a plugging agent, indicating that the gel polymer of the present invention has good plugging layer repairing efficiency.

Comparative example DL1 exhibited significantly lower repairing efficiency of the plugging layer than example L1, which illustrates that gel polymers prepared without the 4 monomers provided in the present invention also exhibited poorer repairing efficiency of the plugging layer as a plugging material.

It can be seen from the results in table 2 that the gel polymer containing the present invention still has good repairing efficiency of the plugging layer at high temperature.

From the results in table 3, it can be seen that the self-repairing efficiency of the gel polymers of examples S1 to S7 are between 25.0 and 58.3, while the self-repairing efficiency of the gel polymers of comparative example DS1 is significantly reduced relative to example S1. In conclusion, when the self-repairing gel polymer suitable for water-based drilling fluid provided by the present invention is used as a plugging agent for drilling fluid, the plugging gel polymer has good plugging effect, high plugging layer repairing efficiency and good high-temperature resistance performance through the synergistic effect of all the structural units. In addition, the preparation method is simple and the cost is low.

The preferred embodiments of the present invention have been described above in detail, but the present invention is not limited thereto. Within the scope of the technical idea of the invention, many simple modifications can be made to the technical solution of the invention, including various technical features being combined in any other suitable way, and these simple modifications and combinations should also be regarded as the disclosure of the invention, and all fall within the scope of the invention.

The invention claimed is:

1. A self-repairing plugging gel polymer suitable for water-based drilling fluid is characterized in that the polymer contains a structural unit A, a structural unit B, a structural unit C and a structural unit D, the structural unit A is a structural unit with a structure shown in the formula (1); the structural unit B is a structural unit with a structure shown in the formula (2); the structural unit C is a structural unit with a structure shown in the formula (3); the structural unit D is a structural unit with a structure shown in the formula (4);

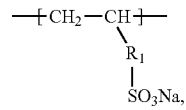

formula (1)

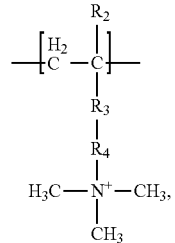

formula (2)

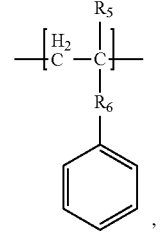

formula (3)

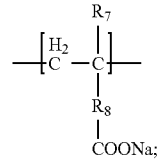

formula (4)

wherein,
in the formula (1), $R_1$ is selected from phenyl ring or $C_{1-3}$ alkylene;
in the formula (2), $R_2$ is selected from H or —$CH_3$, $R_3$ is selected from —CO—NH— or —CO—O—, and $R_4$ is selected from $C_{1-3}$ alkylene;
in the formula (3), $R_5$ is selected from H or —$CH_3$, $R_6$ is selected from $C_{1-3}$ alkylene;
in the formula (4), $R_7$ is selected from H or —$CH_3$, and $R_8$ is selected from phenyl ring or $C_0$ alkylene.

2. The polymer according to claim 1, wherein,
the structural unit A is selected from at least one of a structure shown by the formula (1-1), a structure shown by the formula (1-2), a structure shown by the formula (1-3) and a structural unit shown by the formula (1-4);
the structural unit B is at least one selected from a structure shown in the formula (2-1), a structure shown in the formula (2-2), a structure shown in the formula (2-3), a structure shown in the formula (2-4), a structure shown in the formula (2-5), a structure shown in the formula (2-6), a structure shown in the formula (2-7), a structure shown in the formula (2-8), a structure shown in the formula (2-9), a structure shown in the formula (2-10), a structure shown in the formula (2-11) and a structure shown in the formula (2-12);

the structural unit C is at least one selected from a structure shown in the formula (3-1), a structure shown in the formula (3-2), a structure shown in the formula (3-3), a structure shown in the formula (3-4), a structure shown in the formula (3-5) and a structural unit shown in the formula (3-6);

the structural unit D is at least one selected from a structure shown in the formula (4-1), a structure shown in the formula (4-2), a structure shown in the formula (4-3) and a structural unit shown in the formula (4-4);

the formula (1-1): $R_1$ is a phenyl ring;
the formula (1-2): $R_1$ is $-CH_2-$;
the formula (1-3): $R_1$ is $-CH_2-CH_2-$;
the formula (1-4): $R_1$ is $-CH_2-CH_2-CH_2-$;
the formula (2-1): $R_2$ is H, $R_3$ is $-CO-NH-$, $R_4$ is $-CH_2-$;
the formula (2-2): $R_2$ is $-CH_3$, $R_3$ is $-CO-NH-$, and $R_4$ is $-CH_2-$;
the formula (2-3): $R_2$ is H, $R_3$ is $-CO-O-$, and $R_4$ is $-CH_2-$;
the formula (2-4): $R_2$ is $-CH_3$, $R_3$ is $-CO-O-$, and $R_4$ is $-CH_2-$;
the formula (2-5): $R_2$ is H, $R_3$ is $-CO-NH-$, $R_4$ is $-CH_2-CH_2-$;
the formula (2-6): $R_2$ is $-CH_3$, $R_3$ is $-CO-NH-$, $R_4$ is $-CH_2-CH_2-$;
the formula (2-7): $R_2$ is H, $R_3$ is $-CO-O-$, $R_4$ is $-CH_2-CH_2-$;
the formula (2-8): $R_2$ is $-CH_3$, $R_3$ is $-CO-O-$, $R_4$ is $-CH_2-CH_2-$;
the formula (2-9): $R_2$ is H, $R_3$ is $-CO-NH-$, $R_4$ is $-CH_2-CH_2-CH_2-$;
the formula (2-10): $R_2$ is $-CH_3$, $R_3$ is $-CO-NH-$, $R_4$ is $-CH_2-CH_2-CH_2-$;
the formula (2-11): $R_2$ is H, $R_3$ is $-CO-O-$, $R_4$ is $-CH_2-CH_2-CH_2-$;
the formula (2-12): $R_2$ is $-CH_3$, $R_3$ is $-CO-O-$, $R_4$ is $-CH_2-CH_2-CH_2-$;
the formula (3-1): $R_5$ is H, $R_6$ is $-CH_2-$;
the formula (3-2): $R_5$ is $-CH_3$, $R_6$ is $-CH_2-$;
the formula (3-3): $R_5$ is H, $R_6$ is $-CH_2-CH_2-$;
the formula (3-4): $R_5$ is $-CH_3$, $R_6$ is $-CH_2-CH_2-$;
the formula (3-5): $R_5$ is H, $R_6$ is $-CH_2-CH_2-CH_2-$;
the formula (3-6): $R_5$ is $-CH_3$, $R_6$ is $-CH_2-CH_2-CH_2-$;
the formula (4-1): $R_7$ is H, $R_8$ is a phenyl ring;
the formula (4-2): $R_7$ is $-CH_3$, $R_8$ is a phenyl ring;
the formula (4-3): $R_7$ is H, $R_8$ is $C_0$ alkylene;
the formula (4-4): $R_7$ is $-CH_3$ and $R_8$ is a $C_0$ alkylene.

3. The polymer according to claim 1, wherein the content molar ratio of the structural unit A, the structural unit B, the structural unit C and the structural unit D is 0.1 to 1:1 to 2:0.01 to 0.5:0.1 to 1.

4. The polymer according to claim 1, wherein the content molar ratio of the structural unit A, the structural unit B, the structural unit C and the structural unit D is 0.3 to 0.7:1.8 to 2:0.1 to 0.3:0.3 to 0.7.

5. A method of making a self-repairing plugging gel polymer suitable for water-based drilling fluids, the method comprising:
carrying out polymerization reaction on each component in a polymerization combination in the presence of an alkaline substance and an initiator in an aqueous solvent and a protective atmosphere, wherein the polymerization combination contains a monomer A', a monomer B', a monomer C' and a monomer D';

the monomer A' is selected from monomers with a structure shown in the formula (I); the monomer B' is selected from monomers with a structure shown in the formula (II); the monomer C' is selected from monomers with a structure shown in the formula (II); the monomer D' is selected from monomers with a structure shown in the formula (IV);

the monomer A', the monomer B', the monomer C' and the monomer D' respectively enable the prepared polymer to contain a structural unit A, a structural unit B, a structural unit C and a structural unit D, and the structural unit A is a structural unit with a structure shown in the formula (1); the structural unit B is a structural unit with a structure shown in the formula (2);

the structural unit C is a structural unit with a structure shown in the formula (3); the structural unit D is a structural unit with a structure shown in the formula (4);

formula (I)

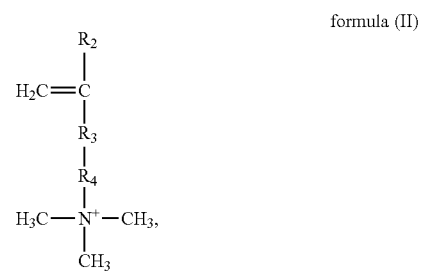

formula (II)

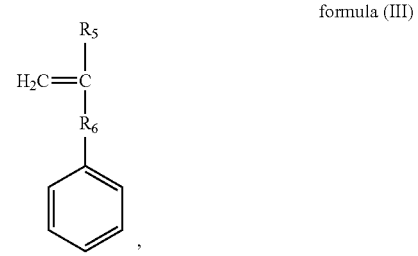

formula (III)

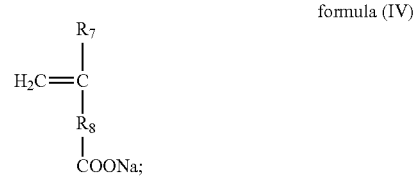

formula (IV)

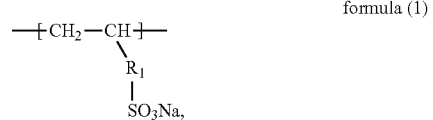

formula (1)

-continued

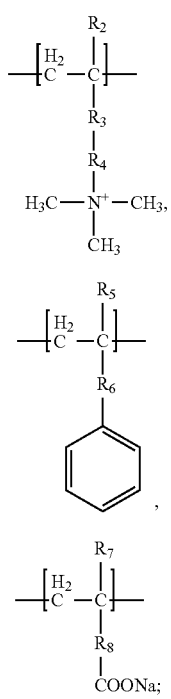

formula (2)

formula (3)

formula (4)

Wherein, $R_1$, $R_2$, $R_3$, $R_4$, $R_5$, $R_6$, $R_7$, $R_8$ are as defined in claim 1.

6. The method according to claim 5, wherein, the monomer A', the monomer B', the monomer C' and the monomer D' are used in such an amount that the content molar ratio of the structural unit A, the structural unit B, the structural unit C and the structural unit D in the prepared polymer is 0.1 to 1:1 to 2:0.01 to 0.5:0.1 to 1.

7. The method according to claim 5, wherein the monomer A', the monomer B', the monomer C' and the monomer D' are used in such an amount that the content molar ratio of the structural unit A, the structural unit B, the structural unit C and the structural unit D in the prepared polymer is 0.3 to 0.7:1.8 to 2:0.1 to 0.3:0.3 to 0.7.

8. The method according to claim 5, wherein the alkaline substance is at least one selected from the group consisting of lithium hydroxide, sodium hydroxide, potassium carbonate and sodium bicarbonate.

9. The method according to claim 5, wherein the initiator is selected from at least one of azo-type initiators, peroxide-type initiators, and redox-type initiators; the azo-type initiator is selected from at least one of azodiisobutyramidine hydrochloride, azodiisopropylimidazoline hydrochloride, azodicyanovaleric acid and azodiisopropylimidazoline; the peroxide-type initiator is at least one selected from hydrogen peroxide, ammonium persulfate, sodium persulfate and potassium persulfate; the redox-type initiator is at least one selected from persulfate-sulfite, persulfate-thiourea and persulfate-organic salt.

10. The method according to claim 5, wherein the conditions of the polymerization reaction at least satisfy: the pH value is 7 to 9, the temperature is 20° C. to 90° C., and the time is 3 h to 15 h.

11. The method according to claim 5, wherein the conditions of the polymerization reaction at least satisfy: the pH value is 7 to 9, the temperature is 50° C. to 80° C., and the time is 8 h to 12 h.

12. The method according to claim 5, wherein the amount of the initiator is 0.1 mmol to 10 mmol, based on 1 mol of the total molar amount of the monomer A', the monomer B', the monomer C' and the monomer D'.

13. A drilling fluid containing the self-repairing plugging gel polymer suitable for the water-based drilling fluid according to claim 1 as a plugging agent.

14. The drilling fluid of claim 13, wherein the polymer is present in an amount of 0.5 wt % to 2.5 wt %.

15. The drilling fluid of claim 13, wherein the drilling fluid is a water-based drilling fluid, and additives are also contained in the water-based drilling fluid.

16. The drilling fluid of claim 15, wherein the additives include bentonite, tackifier, anti-collapse agent, lubricant and sodium carbonate.

17. The drilling fluid of claim 16, wherein in the drilling fluid, relative to 100 parts by weight of water, the content of the bentonite is 2 wt % to 4 wt %, the content of the tackifier is 0.2 wt % to 0.5 wt %, the content of the anti-collapse agent is 2 wt % to 4 wt %, the content of the lubricant is 2 wt % to 4 wt %, and the content of the sodium carbonate is 0.2 wt % to 0.3 wt %.

* * * * *